US011155332B2

(12) United States Patent
Moore et al.

(10) Patent No.: US 11,155,332 B2
(45) Date of Patent: Oct. 26, 2021

(54) WINGLET (71) Applicant: AIRBUS OPERATIONS LIMITED, Bristol (GB)

(72) Inventors: Samuel Moore, Bristol (GB); Scott Roberts, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 117 days.

(21) Appl. No.: 16/569,338

(22) Filed: Sep. 12, 2019

(65) Prior Publication Data

US 2020/0001976 A1 Jan. 2, 2020

Related U.S. Application Data (62) Division of application No. 15/604,197, filed on May 24, 2017, now Pat. No. 10,676,175.

(30) Foreign Application Priority Data

May 24, 2016 (GB) .................................. 1609142

(51) Int. Cl.
*B64C 23/06* (2006.01)
*B64C 3/58* (2006.01)
*B64F 5/10* (2017.01)

(52) U.S. Cl.
CPC .............. *B64C 3/58* (2013.01); *B64C 23/069* (2017.05); *B64F 5/10* (2017.01); *Y02T 50/10* (2013.01)

(58) Field of Classification Search
CPC .......... B64C 23/069; B64C 5/08; B64C 3/58; B64C 23/065; F05B 2240/307
See application file for complete search history.

(56) References Cited

U.S. PATENT DOCUMENTS 2,418,301 A  4/1947 Heal
5,201,479 A  4/1993 Renzelmann
(Continued)

FOREIGN PATENT DOCUMENTS

EP  2792595  10/2014
GB  2468978  9/2010

OTHER PUBLICATIONS

Pipistrel, "Supplemental for Removable wingtips option"; applies to all Sinus 912 aircraft with the Removable wingtips option. [online], [retrieved on May 24, 2017]. Retrieved from the Internet <URL:http://www.pipistrel.si/en/file/download/403_db6bda53ef76/Removable-Wingtips-Sinus1.pdf.

(Continued)

*Primary Examiner* — Richard G Davis
(74) *Attorney, Agent, or Firm* — Nixon & Vanderhye P.C.

(57) ABSTRACT

A winglet for attachment to a wing portion of an aircraft is disclosed having a winglet tip and a winglet root opposite from the winglet tip. The winglet has an opening for receiving therethrough a connector for connecting the winglet to a wing portion in use. The winglet has a retainer internal of the winglet for use in retaining the connector relative to the winglet. The retainer has a hole that extends along an axis that passes through the opening for receiving therethrough a portion of the connector when the connector is located through the opening. The retainer includes a body for reacting against a retention component with which the connector engages in use.

10 Claims, 6 Drawing Sheets (56) References Cited

U.S. PATENT DOCUMENTS

| | | | |
|---|---|---|---|
| 7,975,965 B2 | 7/2011 | Ackermann et al. | |
| 8,602,351 B2 | 12/2013 | Dennison et al. | |
| 8,944,369 B2 | 2/2015 | Marche | |
| 9,371,817 B2* | 6/2016 | Olthoff | F03D 1/065 |
| 9,908,612 B2 | 3/2018 | Fox | |
| 9,914,523 B2 | 3/2018 | Good et al. | |
| 2007/0018049 A1 | 1/2007 | Stuhr | |
| 2009/0302159 A1* | 12/2009 | Pajard | B64C 1/26 244/124 |
| 2011/0180657 A1 | 7/2011 | Gionta et al. | |
| 2011/0243736 A1* | 10/2011 | Bell | F03D 1/0683 416/132 R |
| 2013/0056579 A1 | 3/2013 | Schlipf et al. | |
| 2014/0008487 A1 | 1/2014 | Liu et al. | |
| 2015/0014482 A1 | 1/2015 | Weierman et al. | |
| 2015/0132137 A1* | 5/2015 | Humblot | F03D 1/0683 416/212 R |
| 2015/0203190 A1 | 7/2015 | Witte et al. | |
| 2016/0144951 A1* | 5/2016 | Zaman | B64C 23/065 244/199.4 |
| 2017/0341737 A1 | 11/2017 | Paisley et al. | |

OTHER PUBLICATIONS

"Darling Downs Soaring Club Inc, Rigging and De-Rigging Instructions"; LS7-XOW. [online], [retrieved on May 24, 2017]. Retrieved from the Internet <URL:http://www.ddsc.org.au/documents/manuals/LS7/Rigging%20and%20De-rigging%20LS%20XOW.pdf.

* cited by examiner

WINGLET

CROSS RELATED APPLICATIONS

This application is a Divisional of U.S. patent application Ser. No. 15/604,197, filed May 24, 2017, now pending, which claims priority from Great Britain Patent Application No. 1609142.3, filed May 24, 2016, the entire contents of each of which are hereby incorporated by reference.

TECHNICAL FIELD

The present invention relates to aircraft wings, and in particular to winglets for attachment to wing portions of aircraft.

BACKGROUND

Aircraft wings may comprise devices at their wingtips to change aerodynamic properties of the wings. For example, wing tip fences can act to control vortices at wingtips. Another example is winglets, which typically take the form of small wing-like structures at the end of aircraft wings, and which are angled with respect to the rest of the wing. A winglet may be an upper portion of a wingtip device that is typically angled toward the upper (i.e. suction) surface of the wing, or a lower portion of a wingtip device that is typically angled toward the lower (pressure) surface of the wing. A winglet, for example an upper portion of a wingtip device, can improve the efficiency of an aircraft by improving the lift to drag ratio of a wing. Winglets can also increase effective wingspan without substantially increasing the width of an aircraft. For example, when a wing bends during flight, a lower portion of a wingtip device at the end of the wing can become level so as to provide effective lift, and hence act as a quasi-span extension device. Since the width of an aircraft is often restricted, for example for compatibility with airports, winglets that extend the effective wingspan without extending the width of the plane can be of great utility.

A drawback of some known fittings of winglets to wing portions, such as butt strap fittings, is that interchange of parts so connected can take considerable time and effort, for example, due to the considerable number of components that need to be removed and refitted. Interchange can be particularly burdensome when complex wing geometries are involved, because such geometries can make achieving the required tolerances more difficult.

It would be advantageous for winglets to be easily and quickly attached to, and detached from, wing portions. This would, for example, assist rapid exchange of a winglet for another winglet in the case of damage being sustained by the winglet in use. It would also be advantageous if winglets met interchangeability requirements, i.e. to be able to be taken "off the shelf" and be quickly and easily installed onto and/or removed from a wing portion with minimum reworking of the winglet and/or wing portion.

SUMMARY

A first aspect of the present invention provides a winglet for attachment to a wing portion of an aircraft, the winglet comprising: a winglet tip; a winglet root opposite from the winglet tip and having an opening for receiving therethrough a connector for connecting the winglet to a wing portion in use; and a retainer internal of the winglet and for use in retaining the connector relative to the winglet in use, the retainer having a hole that extends along an axis that passes through the opening for receiving therethrough a portion of the connector when the connector is located through the opening, the retainer comprising a body for reacting against a retention component with which the connector engages in use.

The winglet root may comprise a first thrust bearing for abutting against a second thrust bearing of the wing portion and for defining a minimum distance between the winglet and the wing portion in use.

The winglet may comprise a faring for forming a seal between the winglet and the wing portion in use when the distance between the winglet and the wing portion is at the minimum distance.

The first thrust bearing may be for receiving therethrough the connector when the connector is located through the opening.

The winglet may comprise one or more spigots protruding from the winglet root for receipt into one or more corresponding recesses of a said wing portion.

The, or each, spigot may be tapered.

The winglet may comprise upper and lower surfaces connecting the winglet root to the winglet tip, and at least one of the upper and lower surfaces has an aperture to allow access to the retainer from the exterior of the winglet.

The axis may extend along a path at which a lift force resulting from the winglet in use is greatest.

The winglet may be a lower portion of a wingtip device.

A second aspect of the invention provides a wing portion for an aircraft, the wing portion comprising: an upper surface and a lower surface, at least one of the upper and lower surfaces defining a hole, the hole being for receiving a connector for connecting a winglet to the wing portion; and a fixing arrangement internal of the wing portion, the fixing arrangement being for fixing the connector in the hole.

The hole may be a blind hole.

The fixing arrangement may be for releasably fixing the connector in the hole.

The hole may define an axis that is perpendicular to the one of the upper and lower surfaces at a mouth of the hole.

The lower surface may define the hole.

The fixing arrangement may comprise a threaded surface for mating with a threaded surface of the connector.

The threaded surface of the fixing arrangement may be a female screw thread.

The wing portion may comprise one or more recesses for receiving one or more corresponding spigots of the winglet in use.

The, or each, recess may extend along an axis that is parallel to an axis of the hole.

The wing portion may comprise the connector, and the connector is received in the hole and is fixed in the hole by the fixing arrangement.

A third aspect of the invention provides a wing portion for an aircraft, the wing portion comprising an upper surface, a lower surface, and a connector for connecting a winglet to the wing portion, the connector protruding from one of the upper and lower surfaces and having a threaded surface.

The threaded surface may be distal from the one of the upper and lower surfaces.

The threaded surface may be a male screw thread.

The wing portion may comprise one or more recesses for receiving one or more corresponding spigots of the winglet in use.

The, or each, recess may extend along an axis that is parallel to an axis of the connector.

The, or each, recess may be tapered.

The wing portion may be or may comprise an upper portion of a wingtip device.

A fourth aspect of the invention provides a system, comprising: a wing portion for an aircraft, the wing portion having an upper surface and a lower surface; a winglet according to the first aspect; and the connector, wherein the connector protrudes from one of the upper and lower surfaces of the wing portion, or is for connection to the wing portion so as to protrude from the one of the upper and lower surfaces of the wing portion.

The wing portion may be according to the second aspect.

The connector may protrude from the one of the upper and lower surfaces of the wing portion, is located in the opening of the winglet root, and is located in the hole of the retainer; and the retainer comprises the retention component, the retention component being engaged with the connector and reacting against the body of the retainer to retain the connector in the winglet.

The wing portion may comprise the second thrust bearing, and the second thrust bearing is abutting the first thrust bearing of the winglet to define the minimum distance between the winglet and the wing portion.

The system may comprise a faring that forms a seal between the winglet and the wing portion.

The connector may extend through the first thrust bearing.

The retainer may be adjustable so as to adjust the extent to which the connector extends into the winglet.

The connector may comprise a first threaded surface, and the retention component comprises a second threaded surface for mating with the first threaded surface.

The first threaded surface may be a male screw thread, and the second threaded surface may be a female screw thread.

The retainer may comprise a positive retaining component to limit movement of the retention component relative to the body of the retainer.

The wing portion may comprise the one or more corresponding recesses, and wherein the one or more spigots are located in the one or more recesses.

The connector may be received in the hole of the wing portion and may be fixed in the hole of the wing portion by the fixing arrangement.

The connector may comprise a second threaded surface, and the fixing arrangement may comprise a threaded surface for mating with the second threaded surface of the connector.

The second threaded surface of the connector may be a male screw thread, and the threaded surface of the fixing arrangement may be a female screw thread.

The connector may be a cylindrical spar.

The connector may be removable from the wing portion and from the winglet.

The connector may comprise a fusible portion.

A fifth aspect of the invention provides a method of attaching a winglet according to the first aspect to a wing portion of an aircraft, the method comprising: providing a wing portion having an upper surface, a lower surface, and a connector protruding from one of the upper and lower surfaces; inserting the connector through the opening of the winglet root and into the hole of the retainer; and engaging a retention component with the connector so that the retention component reacts against the body of the retainer so as to retain the connector in the winglet.

The method may comprise inserting the connector into a hole in the one of the upper and lower surfaces of the wing portion; and fixing the connector in the hole in the one of the upper and lower surfaces of the wing portion.

At least one of the winglet and the wing portion may comprise one or more spigots protruding therefrom, and at least one of the other of the winglet and the wing portion comprises one or more corresponding recess therein, and the method comprises: inserting the one or more spigots into the one or more corresponding recesses.

The method may comprise adjusting the retainer to adjust the extent to which the connector extends into the winglet.

A sixth aspect of the invention provides an aircraft comprising a winglet according to the first aspect, or comprising a wing portion according to the second or third aspects, or comprising a system according to the fourth aspect.

BRIEF DESCRIPTION OF THE DRAWINGS

Embodiments of the invention will now be described, by way of example only, with reference to the accompanying drawings, in which.

DETAILED DESCRIPTION

Figure 1:
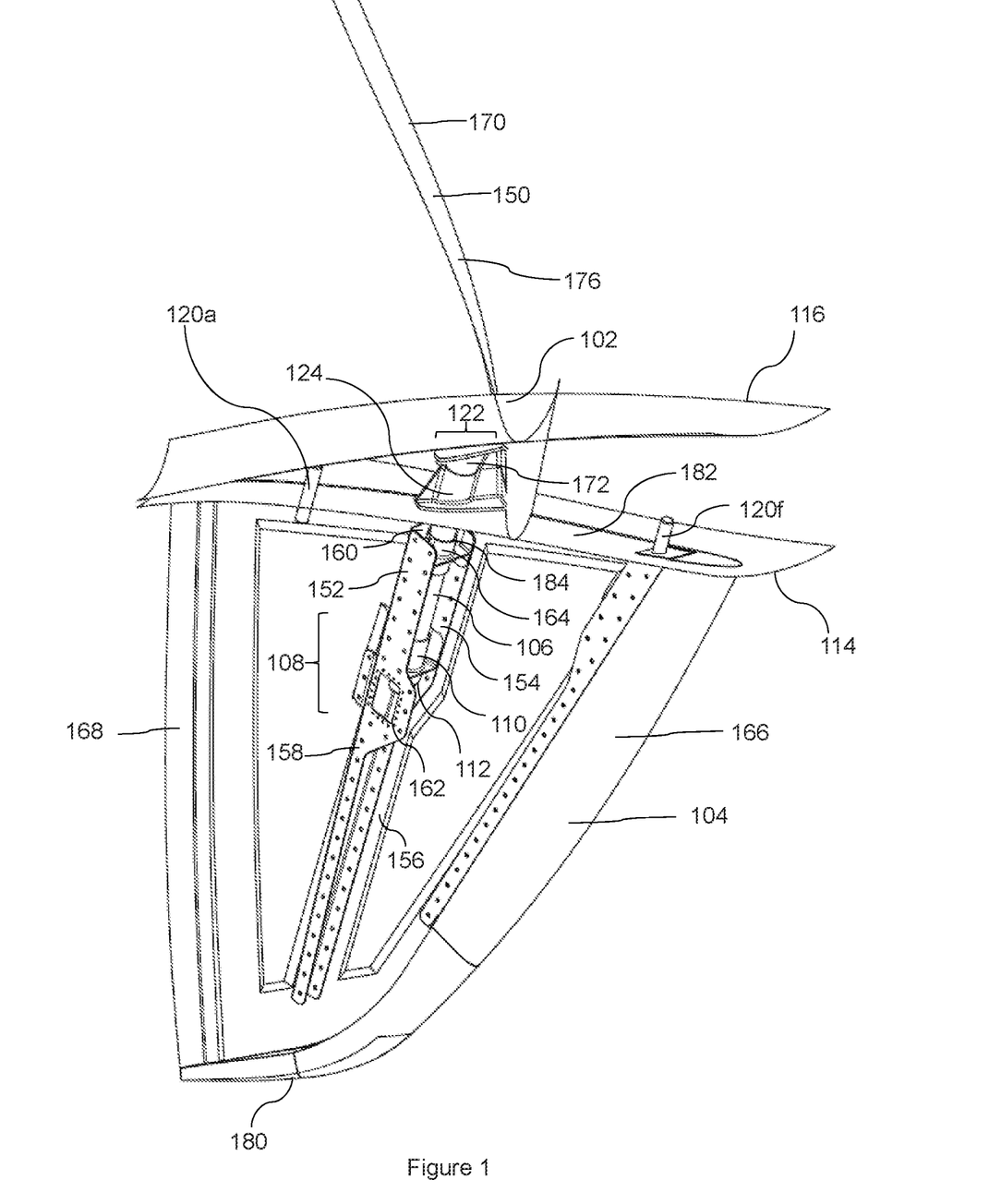
FIG. 1 shows a schematic view of a winglet attached to a wing portion according to an embodiment of the invention.
Figure 2:
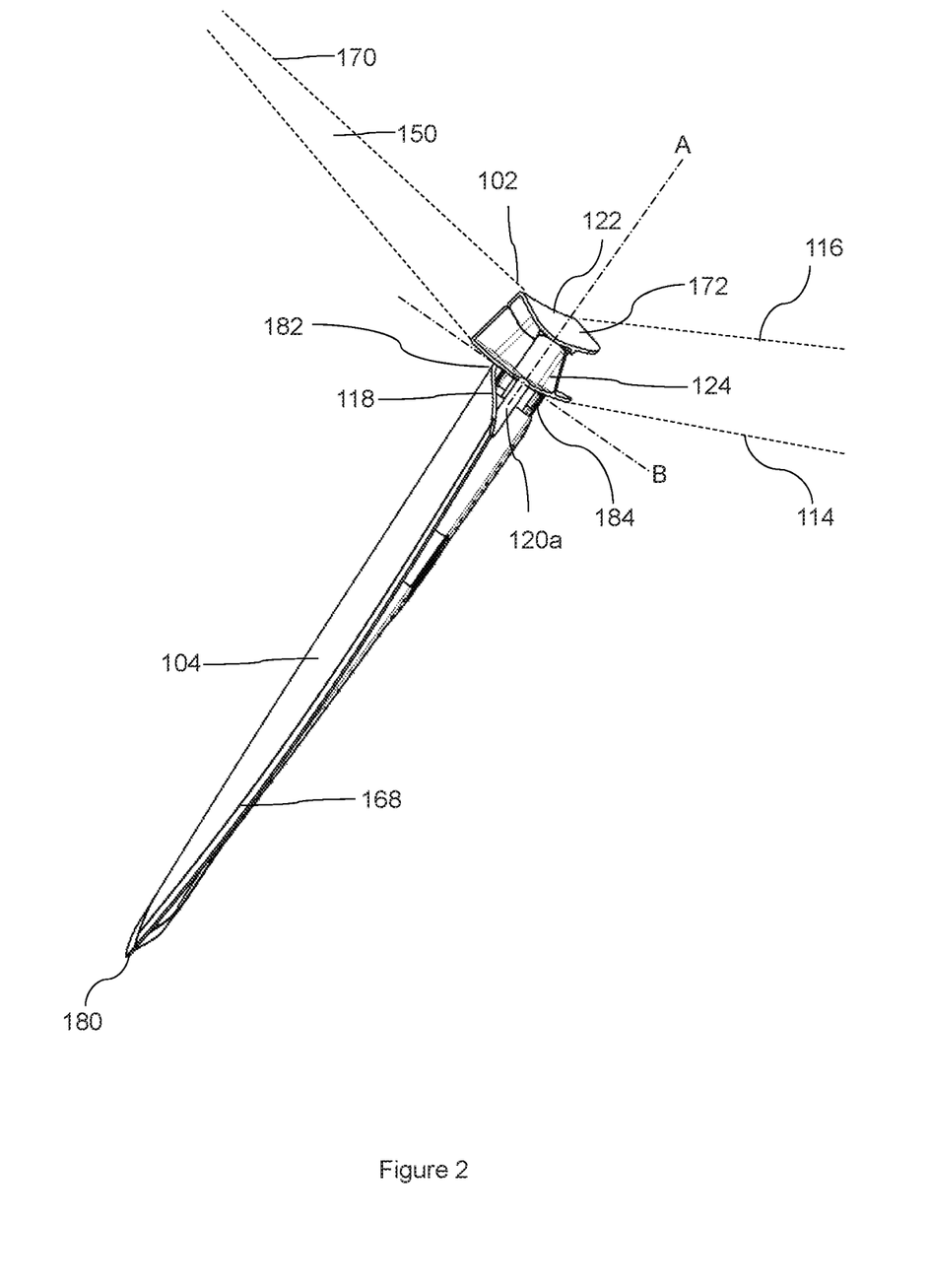
FIG. 2 shows a schematic view of a winglet attached to a wing portion according to an embodiment of the invention.

Referring to FIGS. 1 and 2, in broad overview, a wing portion 102 (only partially illustrated in FIGS. 1 and 2 for clarity) of an aircraft (not itself shown in full in FIGS. 1 and 2) has connected thereto a winglet 104. The wing portion 102 comprises a connector 106 protruding therefrom. The connector 106 extends into the winglet 104. The winglet 104 comprises a retainer 108 internal of the winglet 104 for use in retaining the connector 106 relative to the winglet 104 in use. The retainer 108 comprises a hole through which the connector 106 extends. The retainer 108 comprises a body 110 and a retention component 112 with which the connector 106 is engaged and which reacts against the body 110 in use.

The wing portion 102 comprises an upper surface 116 (also known in the art as a suction surface 116) and lower surface 114 (also known in the art as a pressure surface 114), the lower surface 114 defining a hole (not visible in the figures) for receiving the connector 106. The upper and lower surfaces 116, 114 are "upper" and "lower" during normal use of the wing on the aircraft. The wing portion 102 comprises a fixing arrangement 122 internal of the wing portion 102 for fixing the connector 106 in the hole (not visible). In this embodiment, the connector 106 protrudes from the lower surface 114 of the wing portion 102.

The wing portion 102 comprises an upper portion 150 at an end 170 of the wing distal to the fuselage of the aircraft (the end 170 extending into the page in the sense of FIG. 1 and towards the left of the page in the sense of FIG. 2). For clarity, in FIGS. 1 and 2, the upper portion 150 is only partially shown. Due to the continuous smooth curve along the span of the wing portion 102, the wing portion 102 may itself be considered an upper portion 150 of a wingtip device. The winglet 104 is a lower portion 104 of the wingtip device. Together the upper portion 150 and the lower portion 104 may form the wingtip device. It will be appreciated that although a wingtip device with an upper portion 150 and an attachable a lower portion 104 is illustrated, this need not necessarily be the case in other embodiments. For example, in some embodiments the wing portion 102 may instead be or comprise a lower portion of a wingtip device, and the winglet 104 may be an upper portion of the wingtip device for attaching to the wing portion 102.

The winglet 104 comprises a winglet tip 180 and a winglet root 182 opposite from the winglet tip 180. When connected to the wing portion 102, the winglet root 182 is closer to the wing portion 102 that the winglet tip 180. The winglet tip 180 is that part of the winglet 104 which is most distal from the wing portion 102 in use, whereas the winglet root 182 is that portion most proximal the wing portion 102 in use. The winglet root 182 has, or defines, an opening 184 for receiving therethrough the connector 106 for connecting the winglet 104 to the wing portion 102. The hole of the retainer 108 extends along an axis that passes through the opening 184, and the hole is for receiving therethrough a portion of the connector 106 when the connector 106 is located through the opening 184. The winglet 104 also has upper and lower surfaces that extend between the winglet root 182 and the winglet tip 180.

The winglet 104 comprises a C-section spar 152 (also referred to herein as C spar 152). The C spar 152 is internal of and fixedly connected relative to the winglet tip 180, winglet root 182 and upper and lower surfaces of the winglet 104. The C spar 152 extends along the span of the winglet 104. A first section 154 of the C spar 152 is connected to an upper panel 156 of the winglet (for example using rivets or the like), and a second section 158 of the C spar 152 is connected to a lower panel (removed in the Figures for clarity) of the winglet 104 (for example using rivets or the like), and a third section 160 of the C spar 152 connects the first section 154 and the second section 158 of the C spar 152 together. The first 154, second 158 and third 160 sections form a spar 152 with a "C"-shaped cross section.

The retainer 108 is located inside of the C spar 152 and comprises a body 110 (also referred to herein as a lower reaction fitting 110) through which the connector 106 extends. The lower reaction fitting 110 is fixedly connected to each of the first 154, second 158, and third 160 sections of the C spar (for example by welding or any other suitable connection). The hole (not visible in the figures) of the retainer 108 through which the connector 106 extends is a hole through the body 110 of the retainer 108. At least a portion of an inner surface of the hole is a bearing face for the connector 106. For example, the connector 106 is a cylindrical spar 106, and the lower reaction fitting 110 defines a cylindrical hole through which the connector 106 extends. An inner cylindrical surface (not visible in the figures) of the lower reaction fitting 110 acts as a bearing surface for the outer cylindrical surface 106 of the connector 106 extending therethrough. The lower reaction fitting 110 can therefore effectively react against forces applied via the connector 106, and vice versa. The cylindrical nature of the connector 106 and the lower reaction fitting 110, and hence the cylindrical nature of the bearing surfaces thereof, provide direct load paths in all directions in the plane perpendicular to the longitudinal axis of the connector 106.

The retainer 108 comprises a retention component 112 (e.g. a nut 112) with which the connector 106 is engaged and which reacts against the lower reaction fitting 110 to retain the connector 106 in the winglet 104. For example, the connector 106 may comprise a first threaded surface (not shown), and the retention component 112 may comprise a second threaded surface (not shown) for mating with the first threaded surface. For example, the first threaded surface may be a male screw thread and the second threaded surface may be a corresponding female screw thread. The lower reaction fitting 110 provides a surface (not visible in the figures) perpendicular to the axis of the connector 106 against which the nut 112 reacts, and hence which prevents the winglet 104 from becoming detached from the wing portion 102. The first threaded surface of the connector 106 is distal from the lower surface 114 of the wing portion 102.

The winglet 104 is arranged to provide access for manual adjustment of the retainer 108. Specifically, the lower surface (removed for clarity in the Figures) of the winglet 104 has an aperture to allow access to the retainer 108 from the exterior of the winglet 104. An access panel (removed for clarity in the Figures) is movable to access the aperture and to reveal an access window 162 in the second section 158 of the C spar 152. The access window 162 allows access to and manual adjustment of the nut 112. For example, the nut 112 may be adjusted to adjust the extent to which the connector 106 extends into the winglet 104. For example, the access window 162 allows for the manual tightening of the nut 112 against lower reaction fitting 110, thereby to increase the extent to which the connector 106 extends into the winglet 104 until the winglet 104 is tightened fast to the wing portion 102. Similarly, the access window 162 allows for the manual loosening of the nut 112 with respect to the connector 106, thereby allowing the winglet 104 to be detached from the wing portion 102. For example, the nut 112 may be loosened so as to be removed from the connector 106, thereby allowing the connector 106 to be completely withdrawn from the lower reaction fitting 110 (and hence winglet 104), hence allowing the winglet 104 to be removed from the wing portion 102. In other embodiments, the aperture may be in the upper surface of the winglet 104.

The ability to fixedly connect the winglet 104 to the wing portion 102 by tightening a single nut 112, and indeed to disconnect and remove the winglet 104 from the wing portion 102 by loosening a single nut, provides a particularly rapid and unlaborious way to attach and detach a winglet 104 to/from a wing portion 102. It is noted that since loads parallel to the span of the winglet 104 are minimal in use, the loads needed to be reacted by the nut 112 are small.

The retainer 108 comprises a positive retaining component (not shown) to limit movement of the retention component 112 (e.g. nut 112) relative to the body 110 of the retainer 108. For example, a split pin may be used to prevent the nut 112 from loosening with respect to the connector 106 once the nut 112 has been tightened into place. This helps to ensure that the attachment of the winglet 104 to the wing portion 102 is secure.

In some examples, the winglet 104 comprises a first thrust bearing (not shown), and the wing portion 102 comprises a second thrust bearing (not shown) that abuts against the first thrust bearing (not shown) when the winglet 104 is attached to the wing portion 102. For example, when the nut 112 is tightened against the lower reaction fitting 110, and the winglet 104 is thereby brought towards the wing portion 102, the first thrust bearing of the winglet 104 and the second thrust bearing of the wing portion 102 will be brought towards each other until the first thrust bearing abuts the second thrust bearing, such that the nut 112 cannot be tightened further. The arrangement of the first and second thrust bearings therefore define a minimum distance between the winglet 104 and the wing portion 102. The first and second thrust bearings may, for example, be annular in shape, and the connector 106 may extend through the first and second thrust bearings. This may ensure that forces parallel to the axis of the connector 106 may be symmetrically reacted by the thrust bearings.

The winglet 104 comprises a faring 118 that forms a seal between the winglet 104 and the wing portion 102, for example when the distance between the winglet 104 and the wing portion 102 is at the minimum distance defined by the thrust bearings (not shown). The definition of the minimum distance by the thrust bearings may ensure that the fairing 118 is not deformed on movement of the winglet 104 towards the wing portion 102. However, in some embodiments, the fairing may be deformable. For example, the fairing may be resilient. This can help provide an improved seal.

An upper reaction fitting 164 is located in the C spar 152 at a location along the span of the winglet 104 proximal to the winglet root 182. The upper reaction fitting 164 is fixedly connected to the C spar 152 in the same way as the lower reaction fitting 110. Similarly to the lower reaction fitting 110, the upper reaction fitting 164 defines a cylindrical hole through which the connector 106 extends, and provides a bearing surface against which forces applied via the connector 106 perpendicular to the axis of the connector 106 may be reacted, and vice versa. The upper reaction fitting 164 and the lower reaction fitting 110 may together effectively react moments applied to the winglet 104 via the connector 106, and vice versa.

The C spar 152 (and accordingly the connector 106 and the reaction fittings 110, 164) is located approximately centrally of the winglet 104, i.e. approximately at the centre of the chord of the winglet 104. In this embodiment, the axis of the hole of the lower reaction fitting 110 extends along a path at which the lift force resulting from the winglet 104 in use is greatest. Accordingly, in use the connector 106 extends along this path. The C spar 152, reaction fittings 110, 164, and connector 106 may therefore effectively react lift forces caused by the winglet 104 in use.

The winglet 104 comprises one or more spigots 120a, 120f protruding from the winglet root 182, and the wing portion 102 comprises one or more corresponding recess therein (not shown). The, or each, recess extends along an axis that is parallel to an axis of the hole in the wing portion 102 and parallel to the longitudinal axis of the connector 106. The positions of the one or more spigots 120a, 120f and corresponding one or more recesses (not shown) are axially offset with respect to the connector 106. For example one spigot 120f may be located forward of the connector 106 (i.e. towards the leading edge 166 of the winglet 104), and one spigot 102a may be located aft of the connector 106 (i.e. towards the trailing edge 168 of the winglet 104). The spigots 120a, 120f react against the corresponding recesses (not shown) (and vice versa) thereby to react moments of the winglet 104 about the connector 106 in a plane perpendicular to the connector 106 (i.e. torque loads). The upper reaction fitting 164, the lower reacting fitting 110, and the spigots 120a, 120f therefore provide direct load paths that provide reactions against movement of the winglet 104 with respect to the wing portion 102 in all six degrees of freedom.

It will be appreciated that although two spigots 120a, 120f are illustrated protruding from the winglet 104, this need not necessarily be the case. For example, in other embodiments only one spigot 120f may be used, or any number of spigots (e.g. 3, 4, 5 . . . ) may be used. Further, one or more of the spigots may protrude instead from the wing portion 102, and there may be a corresponding one or more recesses in the winglet 104 (such as in the winglet root 182) for receiving the spigot(s) of the wing portion 102. It will be appreciated that any combination of spigots and recesses may be employed in either one of the winglet 104 and wing portion 102.

At least one of the one or more spigots 120a, 120f may be tapered. At least one of the corresponding recesses (not shown) may be reciprocally tapered accordingly. This may assist the guiding of the one or more spigots 120a, 120f into the one or more corresponding recesses (not shown) when the winglet 104 and the wing portion 102 are brought together.

In this embodiment, the connector 106 extends partially into the wing portion 102, and the wing portion 102 comprises a fixing arrangement 122 internal of the wing portion 102 that fixes the position of the connector 106 with respect to the wing portion 102.

The fixing arrangement 122 and the connector 106 defines an axis (dot-dash line A in FIG. 2) that is perpendicular to a tangent (dot-dash line B in FIG. 2) to a lower surface 114 of the wing portion 102 at the mouth of the hole (not shown) in the wing portion 102. Although not shown, it will be appreciated that in alternative arrangements, for example if the winglet 104 is an upper portion of a wingtip device or otherwise, the hole may alternatively be in the upper surface 116 of the wing portion 102, and/or the connector 106 may alternatively define an axis that is perpendicular to a tangent to the upper surface 116 of the wing portion 102 at the mouth of the hole.

The fixing arrangement 122 comprises an upper portion 172 that is fixedly connected to the upper surface 116 of the wing portion 120 and to a spar 176 of the wing portion 102, and a lower portion 124 (also referred to herein is a main reaction fitting 124) that is fixedly connected to the lower surface 114 of the wing portion 102 and to the spar 176 of the wing portion 102. The upper portion 172 and the lower portion 124 are in mechanical contact with each other so that loads can spread therebetween. The connector 106 extends through the hole (not visible in the Figures) in the lower surface 114 of the wing portion 102, and through a recess (not visible in the figures) of the main reaction fitting 124 so as to be engaged with the upper portion 172 of the fixing arrangement 122. At least a portion of an inner surface of the recess of the main reaction fitting 124 is a bearing face for the connector 106. For example, the connector 106 is a cylindrical spar 106, and the main reaction fitting 124 defines a cylindrical hole through which the connector 106 extends. An inner cylindrical surface (not visible in the figures) of the main reaction fitting 110 acts as a bearing surface for the outer cylindrical surface 106 of the connector 106 extending therethrough.

The fixing arrangement 122 releasably fixes the connector 106 to the wing portion 102. In this embodiment, the connector 106 comprises a male threaded surface (not visible in the Figures), and the upper portion 172 of the fixing arrangement 122 defines a bore (not visible in the Figures) with a corresponding female threaded surface for mating with the male threaded surface of the connector 106. The connector 106 may therefore be engaged with the bore of the upper portion 172 and rotated about its axis A-A thereby to tighten the connector 106 into the upper portion 172 of the fixing arrangement 122, and hence to fix the connector with respect to the wing portion 102. The bore (not visible in the Figures) has a closed end against which the connector 106 may abut when the connector 106 is fully tightened into the upper portion 172 of the fixing arrangement 122. It will be appreciated that in this case the hole in the lower surface 114 of the wing portion 102 is a blind hole.

If desired, the connector 106 may be unscrewed to release the connector 106 from the fixing arrangement 122. It will therefore be appreciated that in this embodiment the connector 106 is removable from both the wing portion 102 and from the winglet 104. The ability to fixedly connect the winglet 104 to the wing portion 102 only by tightening the connector 106 into the fixing arrangement 122 and the simple connection of the winglet 104 to the connector 106 thereafter as described above provides a particularly rapid and unlaborious way to attach (and indeed detach) a winglet 104 to/from a wing portion 102. Moreover, removal of the connector 106 from the fixing arrangement 122 leaves only a small hole (not visible in the figures) in the wing portion 102, which can be covered (if necessary) simply and quickly with an appropriate faring or "plug", for example. Removal of the winglet 104 from the wing portion 102 therefore necessitates little or no further alteration to wing portion 102 in order for the aircraft to fly without the winglet 104 if desired, and hence allows for particularly rapid attachment/detachment of the winglet 104 to/from the wing portion 102.

Minimal components need to be accessed and/or removed in order to remove, exchange or install the winglet 104, which increases the reliability and longevity of the system. Access only to one side of the winglet 104 is needed in order to attach/remove the winglet 104, hence further increasing the speed and simplicity of attachment/removal of the wing portion. No special tools are required to install and/or remove the winglet 104. Moreover, since the attachment of the connector 106 to the winglet 104 is internal of the winglet 104, winglets 104 of various shapes and sizes can be interchangeably connected to the wing portion 102 without any corresponding modification to the wing portion 102. That is, the system satisfies interchangeability (ICY) requirements. The minimum distance between the winglet 104 and the wing portion 102 defined by the abutting thrust bearings (not shown) allows the faring 118 of the winglet 104 to provide predictable sealing of the winglet 104 to the wing portion 102, and hence reduces the complexity of sealing as compared to conventional designs.

The above described examples require a relatively few and simple components as compared to conventional designs based on butt straps or the like. This reduces the overall weight of the system as compared to such conventional designs.

In the above described examples, the resultant moment from the air pressure on the winglet 104 in use is reacted by the main reaction fitting 124 of the wing portion 102 and the upper reaction fitting 164 of the winglet 104. The distance between the main reaction fitting 124 and the upper reaction fitting 164 is relatively large (and independent of the thickness of the winglet 104), and hence the loads needed to be reacted by the main reaction fitting 124 and the upper reaction fitting 164 for a given moment are relatively small. This is as compared to some conventional designs in which the moment is reacted at the upper and lower skins of the winglet, the distance between which is dependent on the thickness of the winglet and can be relatively small, and hence the loads reacted relatively large and dependant on the thickness of the winglet. The above described examples therefore reduce the reactions required to be provided by the fittings in some cases by up to a third. Moreover, the above described examples react the loads from air pressure on the winglet 104 in the same plane as the skins (i.e. the upper and lower surfaces) of the winglet 104, which is more efficient than in conventional designs where this is not the case.

The connector 106 may comprise a fusible portion (not shown). That is, a portion of the connector 106 may be purposefully configured to fail or break at a predefined stress, for example sheer stress. This may be useful to ensure that if the winglet 104 were to contact an external object with greater than a predetermined force, the winglet 104 detaches from the wing portion 102 before the force is able to damage the wing portion 102.

Referring to FIGS. 3a to 3d, an example method of attaching the winglet 104 to the wing portion 102 is described.

Figure 3A:
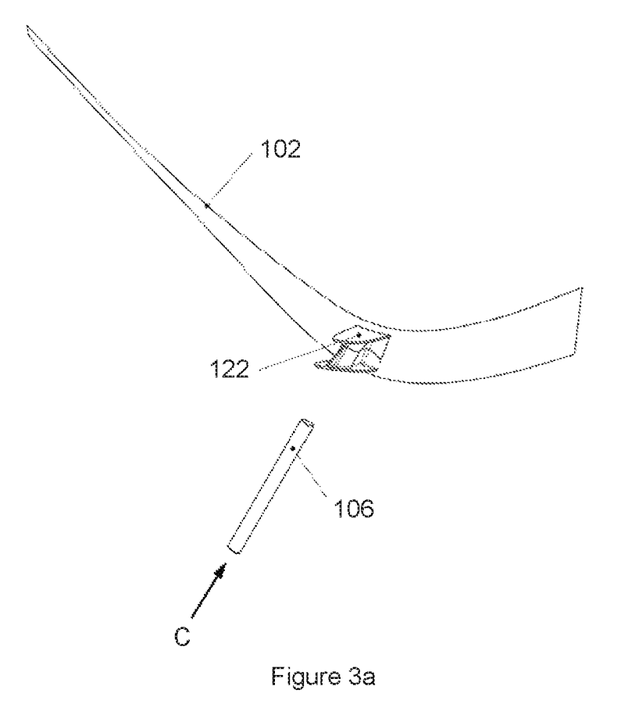
FIGS. 3a to 3d show schematically a method of attaching a winglet to a wing portion according to an embodiment of the invention.

In a first step as shown schematically in FIG. 3a, the connector 106 is inserted (arrow C) into the hole in the lower surface 114 of the wing portion 102 so as to engage with the fixing arrangement 122.

Figure 3B:
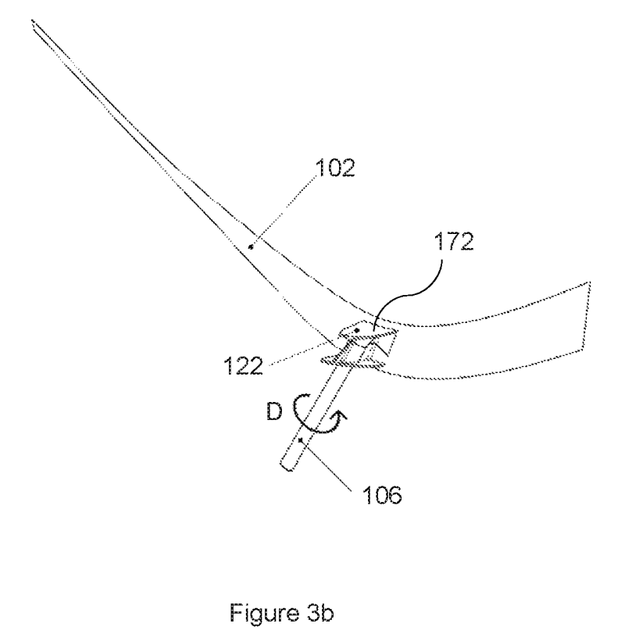

In a second step as shown schematically in FIG. 3b, connector 106 is mated (arrow D) with the fixing arrangement 122 to fix the connector 106 with respect to the hole and the wing portion 102. In this embodiment, the male threaded surface of the connector 106 is engaged with the female threaded surface of the fixing arrangement 122 by rotating the connector 106 in a clockwise fashion until the connector 106 abuts against a surface of the upper portion 172 of the fixing arrangement 122. As a result of the first and second steps, the connector 106 protrudes from the lower surface 114 of the wing portion 102. It will be understood that in other embodiments in which the hole in the wing portion 102 is through the upper surface 116 of the wing portion 102, the connector 106 would then protrude from the upper surface 116 of the wing portion 102.

Figure 3C:
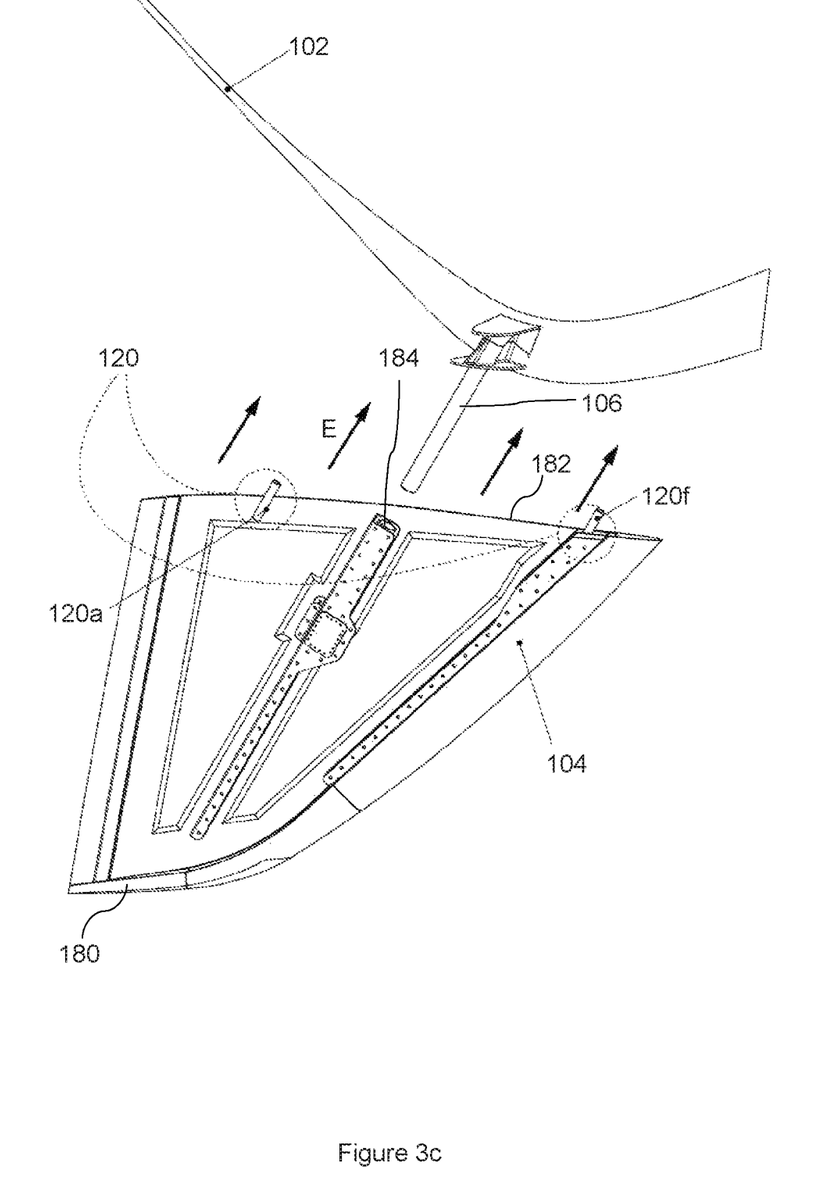
Figure 3D:
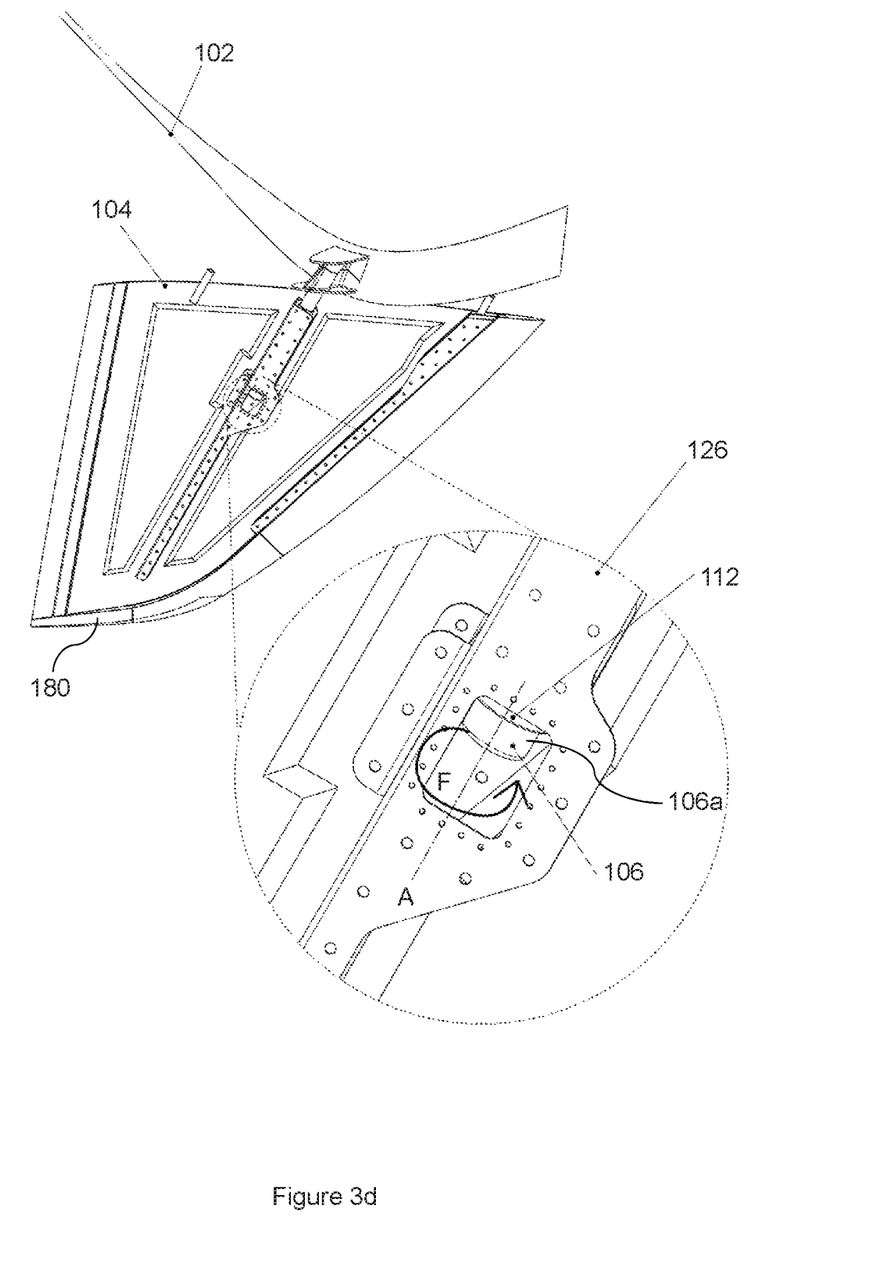

In a third step as shown schematically in FIGS. 3c and 3d, the winglet 104 is placed (arrows E) over the connector 106 so that the connector 106 is inserted into the winglet 104 through the opening 184 of the winglet root 182 and into the hole of the lower reaction fitting 110 of the retainer 108. At this stage, the spigots 120a, 120f of the winglet 104 are inserted into the corresponding recesses (not shown in the figures) in the wing portion 102.

In a fourth step as shown schematically in FIG. 3d, the retention component 112 (e.g. nut 112) is engaged with the connector 106 so that the retention component 112 reacts against the lower reaction fitting 110 of the retainer 108 so as to retain the connector 106 in the winglet 104. More specifically, in this embodiment a male threaded end 106a of the connector 106 extends through the lower reaction fitting 110 (not visible in FIG. 3d), a female threaded nut 112 is manually engaged with the male threaded end 106a of the connector 106, and the nut 112 is rotated (arrow F) clockwise so as to tighten the nut 112 onto the connector 106. The nut 112 is tightened (arrow F) until it abuts the lower reaction fitting 110 (not visible in FIG. 3). The nut 112 may then be further tightened so as to adjust the extent to which the connector 106 extends into the winglet 104 until the winglet 104 is tightened fast to the wing portion 102. For example, the retainer 108 may be adjusted such that a first thrust bearing (not shown) of the winglet 104 and the second thrust bearing (not shown) of the wing portion 102 abut each other to define a minimum distance between the wing portion 102 and the winglet 104. At this stage, a positive retaining component (not shown), for example a split pin, may be inserted through a hole in the connector 106 to help prevent loosening of the nut 112 with respect to the connector 106.

It will be appreciated that the above steps can be performed in reverse so as to disconnect the winglet 104 from the wing portion 102. Briefly: After removing any positive retaining component (not shown) through the connector 106, the nut 112 may be loosened (rotated anticlockwise) and removed from the connector 106, and the connector 106 may be extracted from the winglet 104. The connector 106 may also be loosened (rotated anticlockwise) and removed from the fixing arrangement 122 in the wing portion 102. The hole (not visible) in the lower surface 114 of the wing portion 102 may then be sealed by inserting an appropriately dimensioned faring or plug.

Figure 4:
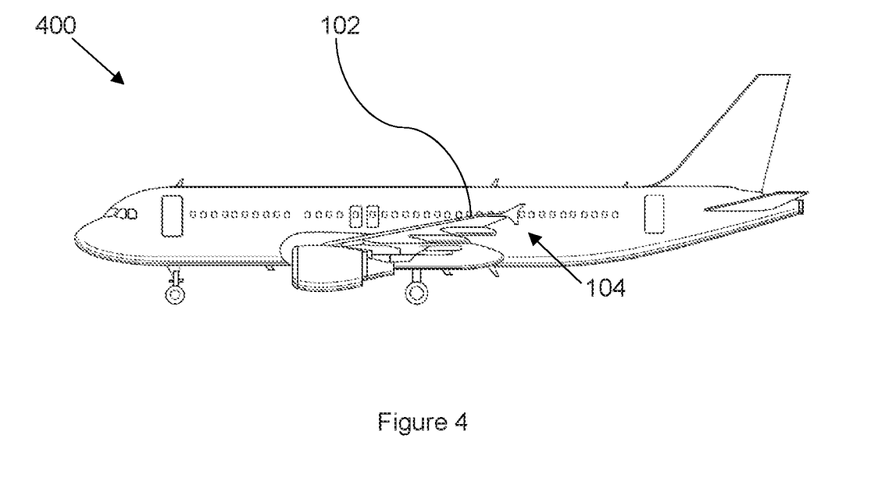
FIG. 4 shows a schematic view of an aircraft according to an embodiment of the invention.

FIG. 4 shows a schematic view of an example aircraft 400 comprising the above described wing portion 102 and winglet 104.

Although the illustrated examples refer to the connector 106 extending into the wing portion 102 and being engaged into the fixing arrangement 122, it will be appreciated that this need not necessarily be the case. In other examples, the wing portion 102 may comprise a connector protruding from an upper 116 or lower 114 surface of the wing portion 102. In these examples, the connector 106 may have only one threaded surface, for example a male thread, at an end 106*a* of the connector 106 distal from the wing portion 102.

Although in the above examples the connector 106 is a cylindrical spar with a male threaded end 106*a* received and secured into a female threaded nut 112, which nut reacts against the lower reaction fitting 110, it will be appreciated that this need not necessarily be the case. For example, the nut may instead be a capped nut which is only open at one end. Indeed, it will be appreciated that there are many other possibilities for engaging a connector with a retention component that reacts against a body of a retainer. In some embodiments, the connector 106 need not be cylindrical, and at least a portion thereof may be cuboidal or have any other shaped cross section. Accordingly, the reaction fittings 110, 172, 164 need not have cylindrical recesses, and may be shaped accordingly to receive therethrough the connector 106 or portion thereof.

The above described examples are to be understood as illustrative examples only. Any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A wing portion for an aircraft, comprising:
   an upper surface,
   a lower surface, and
   a connector for connecting a winglet to the wing portion, the connector protruding from one of the upper and lower surfaces and having a threaded surface, and
   wherein the connector is a cylindrical spar.

2. A wing portion according to claim 1, wherein the threaded surface is distal from the one of the upper and lower surfaces.

3. A wing portion according to claim 1, wherein the threaded surface is a male screw thread.

4. A wing portion according to claim 1, wherein the wing portion comprises one or more recesses for receiving one or more corresponding spigots of the winglet in use.

5. A wing portion according to claim 1, wherein the wing portion is or comprises an upper portion of a wingtip device.

6. A wing portion according to claim 5, wherein the winglet is a lower portion of the wingtip device.

7. A wing portion according to claim 1, wherein the connector comprises a first threaded surface.

8. A wing portion according to claim 7, wherein the connector comprises a second threaded surface.

9. A wing portion for an aircraft, comprising:
   an upper surface,
   a lower surface, and
   a connector for connecting a winglet to the wing portion, the connector protruding from one of the upper and lower surfaces and having a threaded surface,
   wherein the wing portion comprises one or more recesses for receiving one or more corresponding spigots of the winglet in use, and
   wherein the, or each, recess extends along an axis that is parallel to an axis of the connector.

10. A wing portion for an aircraft, comprising:
   an upper surface,
   a lower surface, and
   a connector for connecting a winglet to the wing portion, the connector protruding from one of the upper and lower surfaces and having a threaded surface,
   wherein the wing portion comprises one or more recesses for receiving one or more corresponding spigots of the winglet in use, and
   wherein the, or each, recess is tapered.

\* \* \* \* \*